No. 639,757. Patented Dec. 26, 1899.
M. McDOWELL.
ROTARY HEARTH AND WELDING FURNACE.
(Application filed Nov. 5, 1898.)
(No Model.) 3 Sheets—Sheet 1.
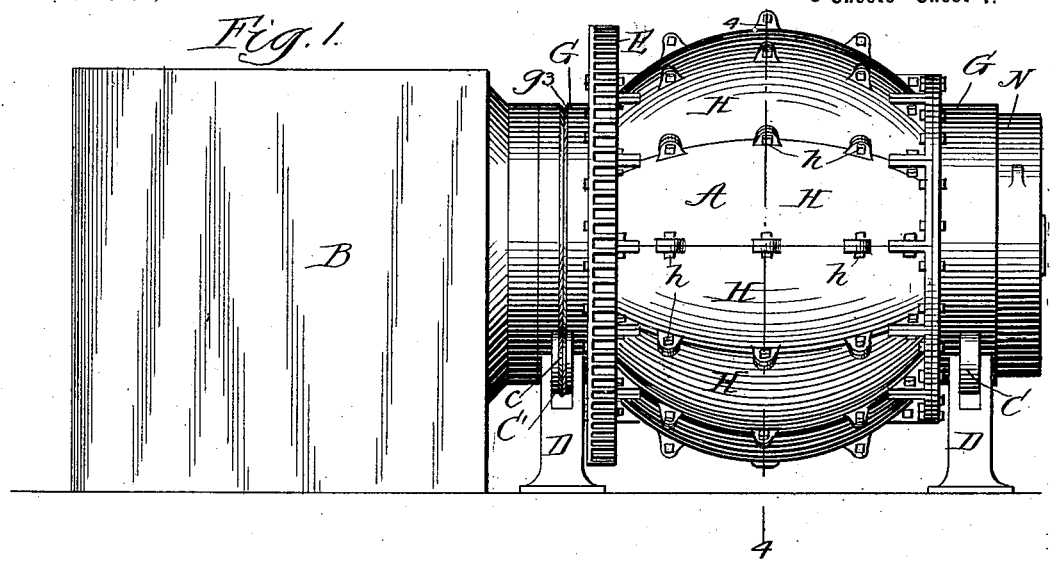
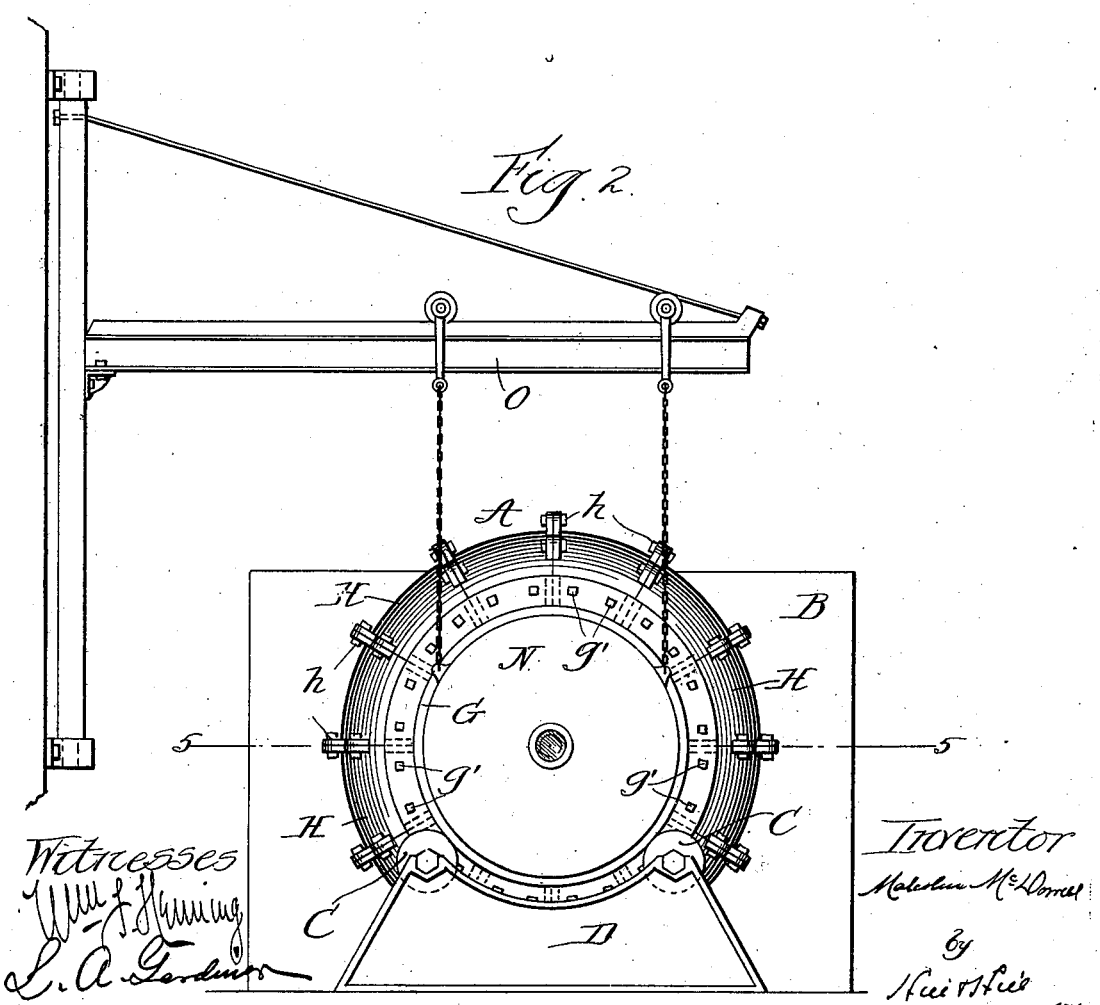

No. 639,757. Patented Dec. 26, 1899.
M. McDOWELL.
ROTARY HEARTH AND WELDING FURNACE.
(Application filed Nov. 5, 1896.)
(No Model.) 3 Sheets—Sheet 2.

Witnesses
Inventor

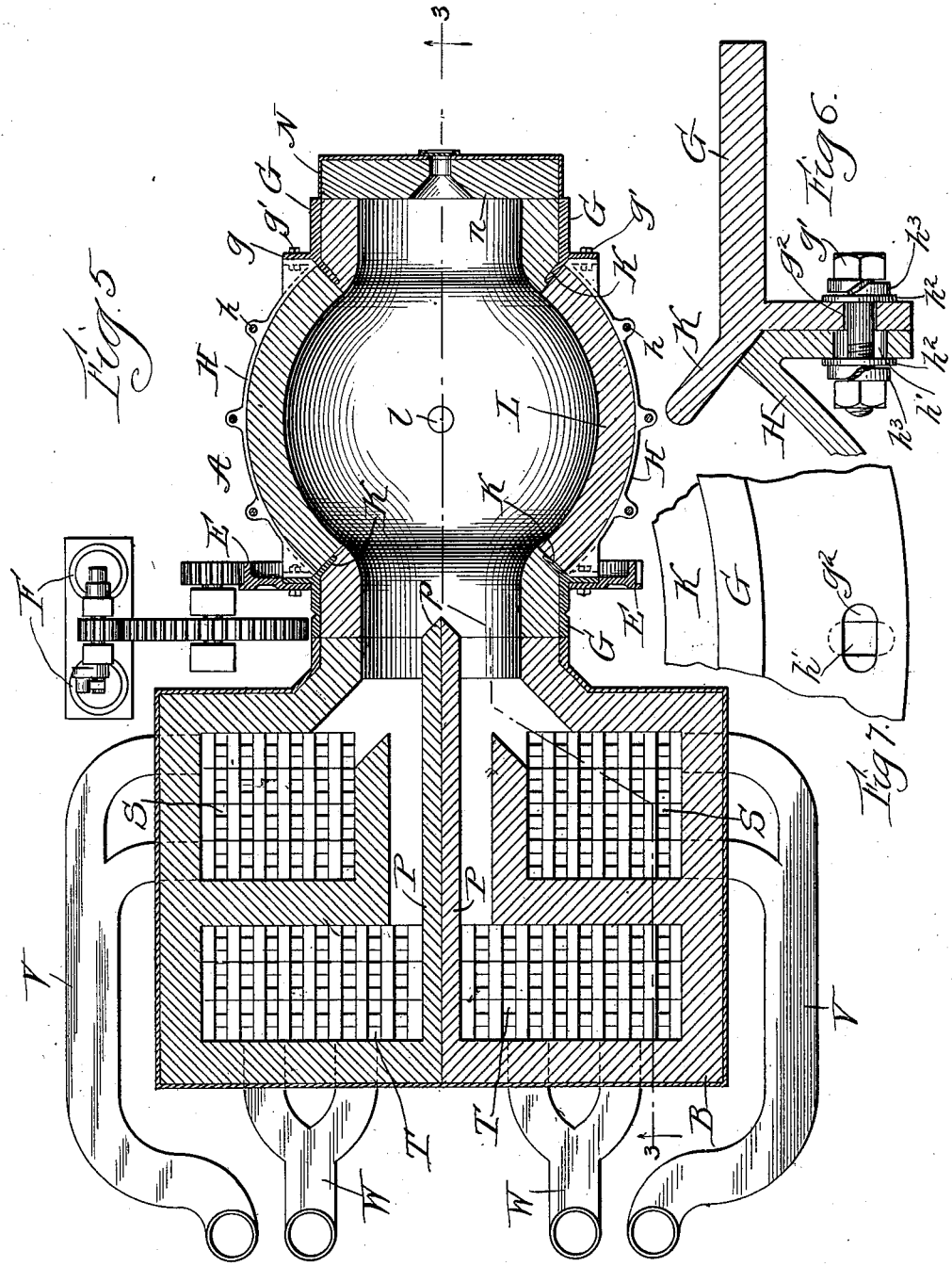

UNITED STATES PATENT OFFICE.

MALCOLM McDOWELL, OF CHICAGO, ILLINOIS, ASSIGNOR, BY MESNE ASSIGNMENTS, TO THE FORT DEARBORN IRON COMPANY, OF SAME PLACE.

ROTARY HEARTH AND WELDING FURNACE.

SPECIFICATION forming part of Letters Patent No. 639,757, dated December 26, 1899.

Application filed November 5, 1896. Serial No. 611,171. (No model.)

*To all whom it may concern:*

Be it known that I, MALCOLM MCDOWELL, a citizen of the United States of America, residing at Chicago, in the county of Cook and State of Illinois, have invented certain new and useful Improvements in Rotary Heating and Welding Furnaces, of which the following is a description.

Figure 3:
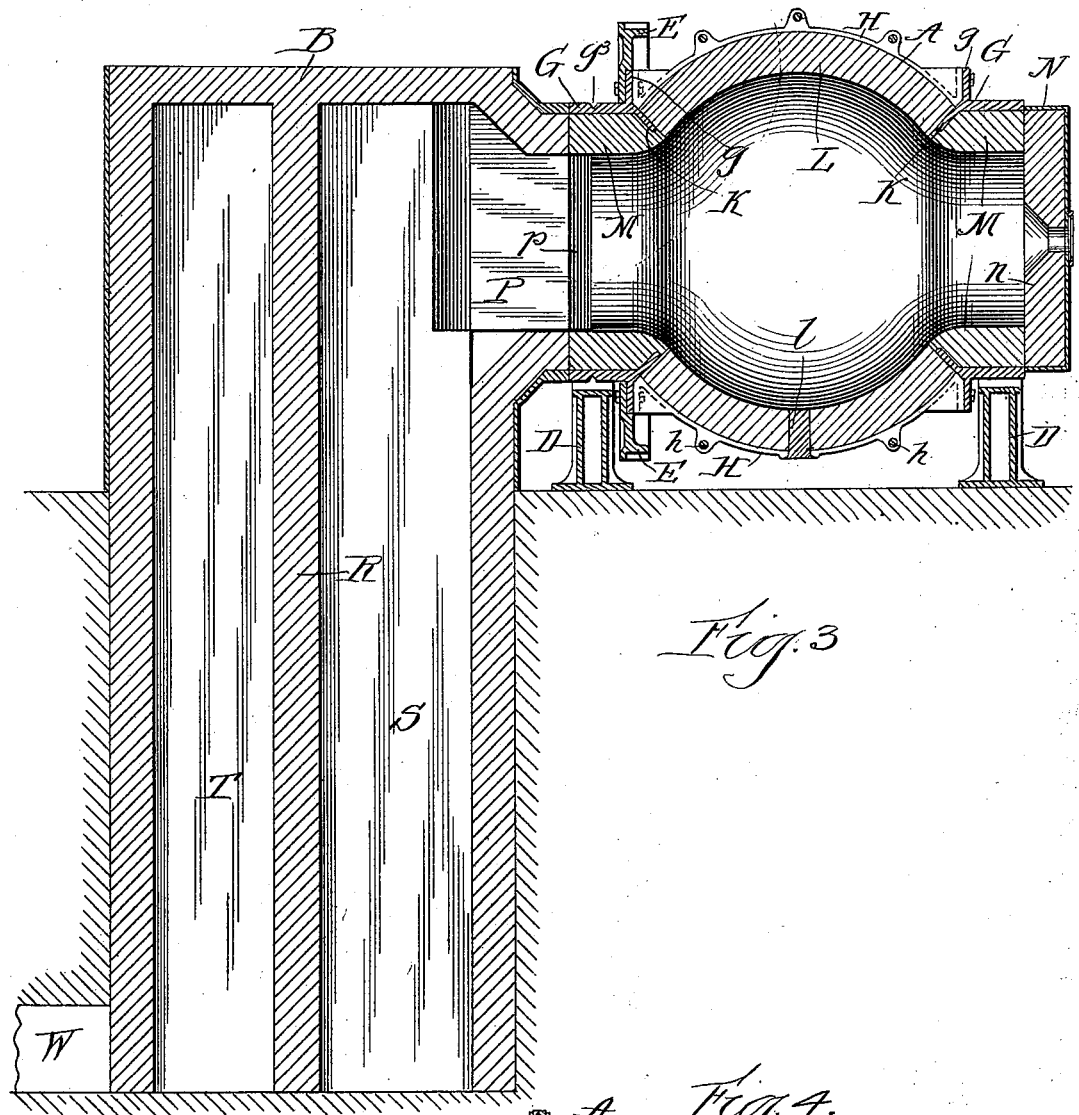
Figure 4:
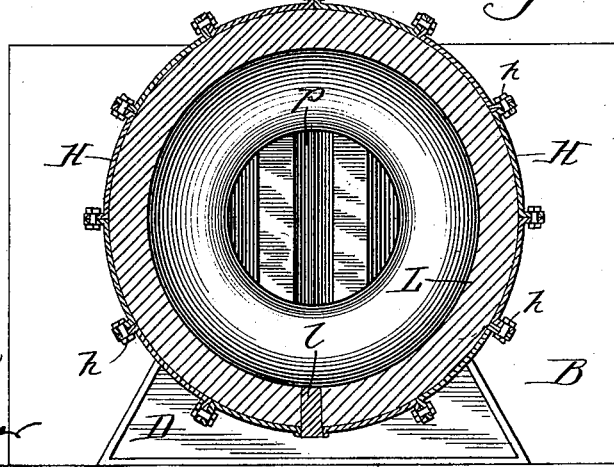

Referring to the accompanying drawings, wherein like reference-letters indicate like or corresponding parts, Figure 1 is a side elevation of my improved furnace. Fig. 2 is an end view taken at right angles to Fig. 1. Fig. 3 is a vertical section of my improved furnace, taken in line 3 3 of Fig. 5. Fig. 4 is a transverse vertical section of the same in line 4 4 of Fig. 1. Fig. 5 is a horizontal section in line 5 5 of Fig. 2. Fig. 6 is a section showing the preferred method for securing the staves to the rings and to each other, and Fig. 7 is a view showing the position of the bolt-holes.

In a newly-invented process for treating scrap iron or steel, fully set forth and described by me in a pending application for Letters Patent of the United States, filed October 28, 1896, Serial No. 610,262, I use the rotary heating and welding furnace. The present invention is especially designed for use in carrying out such process, as well as for use in any case where a rotary motion is desired in a furnace especially designed for both heating and welding purposes.

To this end it consists, primarily, in a rotary heating and welding furnace especially adapted for the purpose named and arranged to be alternately rotated first in one direction and then in the other.

It also consists in so constructing such a furnace that the worn or broken parts may be easily replaced with new at a minimum expense for time, labor, and material.

It also consists in such other novel features in the construction and combination of parts as are shown and described, and particularly pointed out in the claims.

In the drawings, A represents the rotary furnace, and B the regenerator for heating the same. The furnace is carried upon rollers C C, which are supported on the standards D D. A large gear-wheel E on one end is connected by suitable gearing to a source of power—for example, the engines F—for imparting rotary motion to the furnace. The engines are capable of being reversed in order that the furnace may be rotated alternately first in one direction and then in the other at will.

The furnace is made up as follows: The end rings G G form the bearing-surfaces and are provided with flanges $g$, to which the staves H are secured at their ends, Figs. 1, 5, and 6, by the bolts $g'$. The staves are also secured to one another by bolts $h$ passed through extending lugs or wings in the staves. The rings G G are constructed with skewbacks K, which extend diagonally inward, serving to hold the arch in position, composing the bosh L or interior spherical face of the furnace. The bosh is composed of any suitable material. I preferably use for this purpose hydraulically-pressed and furnace-dried brick, of suitable form, composed of chrome iron ore mixed with a small quantity of lime and a sufficient quantity of coal-tar for a binder.

In forming the interior or bosh of the furnace the rings G G are placed in proper relation to one another and are connected by a sufficient number of staves H to cause them to retain their position. A form is then placed within and the arch preferably covered by a single stave laid between the skewbacks K K, the stave being removed for that purpose. When that section of the bosh is finished, the stave covering it is replaced and secured and one of the adjacent staves removed in a similar manner for the same purpose, so continuing until the bosh is completed. When the bosh is thus completed and in place, the cylindrical necks M of the furnace are laid in with fire-brick. When ready for firing, the first heating is very gradual and is continued until the chrome concrete becomes a solid shell. A tap-hole $l$ is provided at a convenient point for drawing off the slag or cinder.

A door N, constructed with a suitable lining $n$, closes the outer end of the furnace. It is easily handled by means of the crane O. The inner end of the furnace revolves in close contact to the wall of the regenerator and is caused to retain such relative position in any preferred manner. For example, a groove $g'$ may be constructed in the ring and a bead $c$ in the roller corresponding to the groove, or the reverse, for such purpose.

To allow for the expansion and contraction of the furnace, I construct the parts with elongated bolt-holes $g^2$ $h'$, Figs. 6 and 7, arranged to cross one another at substantially a right angle, as shown, and then secure the parts together with bolts, as described, using, in addition to ordinary washers $h^2$, a spring nut-lock $h^3$. That known as the "Vernon" spring nut-lock is suitable for this purpose. It will thus be seen that the parts are allowed a movement upon one another in either direction and that upon cooling the contraction is accounted for by the spring nut-locks, as described.

It will be seen, as thus described, my improved heating and welding furnace bears a general resemblance to a rotary puddling-furnace. The objects sought, the manner of use, and the results attained are, however, quite different. In a rotary puddling-furnace the interior is lined after each heat by what is termed a "fix," which is designed to melt down with the liquid metal and enter into the composition of the product. By being thus relieved or restored each time the furnace is protected from the extreme heating and the acids and lasts an indefinite length of time. As such furnaces are now constructed when the interior wall is worn out it is the common practice to replace the furnace with an entire new one. In a heating and welding furnace, on the other hand, the material treated has already been manufactured and all that is required is to have a lining that will stand a high welding heat and will be maintained in place for a large number of heats. Unlike a puddling-furnace a deposit adheres to the surface of the furnace, so much so that at intervals the inside lining has sometimes to be removed and the whole or a part restored. In the case of a puddler the lining (fix) is restored after each heat, taking approximately as much time and heat as it does to make a heat. In the heating and welding furnace the lining is used for a large number of heats and is repaired in part or in whole by new.

My invention is particularly designed for the repairing of such furnaces as described in the easiest and most economical manner.

Any preferred system of firing may be employed with my improved furnace. To secure the best results, however, I prefer to direct the flame alternately first upon one side of the furnace and then upon the other, reversing the rotation of the furnace at the same time. For this purpose I show a gas-regenerating furnace of a peculiar construction.

In the drawings, B represents the regenerating-furnace, which is divided vertically from top to bottom by the wall P, making two distinct sets of regenerating-chambers for the gas and air. The upper end of the wall extends well into the neck of the furnace at $p$. Each of these two chambers is also vertically divided from top to bottom by the walls R R, thus dividing the regenerator into four parts or wells, of which S S are designed for gas and T T for air. The regenerating-brick shown in each are located as in all regenerating-furnaces for alternately taking up and giving off the heat from the products of combustion. The ducts V V supply gas to the chambers or wells S S, while the ducts W W supply air to the wells T T. Each set of ducts V W is properly connected to a source of supply and is also connected to a common stack, so that as the air and gas of one side are shut off those ducts are by the same movement connected to the stack, thus serving as an outlet, while the gas and air are turned on on the opposite side. The current or direction of the flame is thus alternately reversed from one side to the other, directing the flame first upon one side of the rotary furnace and then upon the other, as stated.

The mode of operation is as follows: A suitable charge of material, preferably of properly-cleaned scrap iron or steel, is placed in the rotary furnace, together with a proportionate amount of a suitable flux—such, for example, as ferrosilicate of manganese or ferro-carbureted silicon and manganese—and the rotary furnace started. The heat is then turned on alternately first from one side and then the other, the motion of the rotary furnace being reversed at the same time. The material is thus carried alternately well up on the sides of the furnace, and the flame is thus directed upon it in a manner to secure the best results. The furnace thus becomes a mechanical baller, and as the material approaches the welding heat it becomes a mass or ball which is removed and subjected to pressure by being passed through a squeezer or subjected to hammering. The resulting product is a solid, homogeneous bloom or billet of metal, which may then be subjected to further treatment, if desired, in the usual manner.

Having thus described my invention, what I claim as new, and desire to secure by Letters Patent, is—

1. In a rotary furnace the supported rings constructed with interiorly-extending skewbacks, the staves secured at their ends to the rings and at their sides to one another, lining for the rings and also for the space between the skewbacks, means for drawing off the slag or cinder, and means for temporarily closing the outer end of the drum, in combination with mechanism for rotating the drum, and means for heating the same, substantially as and for the purposes described.

2. In a rotary furnace, the supported drum consisting of the rings having interiorly-extending skewbacks, the staves resiliently secured at their ends to the rings and at their sides to one another, lining for the rings and also for the space between the skewbacks, means for closing the outer end of the furnace and means for drawing off the slag or cinder, in combination with mechanism for rotating the drum and means for heating the same, substantially as described.

3. In a rotary furnace, the drum A consisting essentially of the rings, G, G, constructed with skewbacks K staves, H, adapted to be secured at the ends to the rings and on the sides to each other by means of bolts passed through elongated bolt-holes in the meeting parts crossing at an angle, means for drawing off the slag or cinder, and means for closing the outer end of the furnace, in combination with mechanism for rotating the furnace and means for heating the same, substantially as described.

4. In a rotary furnace, the drum consisting essentially of the rings, G, constructed with skewbacks, K, the staves, H, resiliently secured at their ends to the rings and on their sides to each other by means of bolts passed through elongated bolt-holes in the parts crossing each other at an angle, spring-washers between the head and nut of the bolt and parts secured together, means for drawing off the slag or cinder, and means for closing the outer end of the furnace, in combination with mechanism for rotating the furnace and means for heating the same, substantially as described.

5. In a reversible rotary furnace, the supported drum consisting of the rings having interiorly-extending skewbacks, staves secured to the rings and also to one another, lining for the rings and also for the space between the skewbacks, means for drawing off the slag or cinder, means for temporarily closing the outer end of the drum, and mechanism for rotating the drum in either direction at will, in combination with a regenerating-furnace divided into two chambers by a vertical wall, the upper part of which extends partially into the neck of the drum, a vertical wall also dividing each chamber into two parts for the admission and mingling of gas and air, pipes connecting such parts with a source of supply and also with a stack, and means for making the connection with either the source of supply or with the stack, at will, whereby each chamber alternately becomes an inlet for the combustible gases and then an outlet for the products of combustion, substantially as described.

6. In a reversible rotary furnace, the supported drum consisting of the rings having interiorly-extending skewbacks, staves resiliently secured to the rings and also to one another, lining for the rings and also for the space between the skewbacks, means for drawing off the slag or cinder, means for temporarily closing the outer end of the drum, and mechanism for rotating the drum in either direction, at will, in combination with a regenerating-furnace divided into two chambers by a vertical wall, the upper part of which extends partially into the neck of the drum, a vertical wall also dividing each chamber into two parts for the admission and mingling of gas and air, pipes connecting such parts with a source of supply and also with a stack, and means for making the connection with either the source of supply or with the stack, at will, whereby each chamber alternately becomes an inlet for the combustible gases and then an outlet for the products of combustion, substantially as described.

MALCOLM McDOWELL.

Witnesses:
L. A. GARDINER,
A. A. BORRETT.